(12) United States Patent
Usui et al.

(10) Patent No.: US 6,187,251 B1
(45) Date of Patent: *Feb. 13, 2001

(54) PROCESS FOR PRODUCING THERMOPLASTIC RESIN HOLLOW MOLDED ARTICLE

(75) Inventors: Nobuhiro Usui; Akihiro Furuta, both of Osaka (JP)

(73) Assignee: Sumitomo Chemical Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/095,130

(22) Filed: Jun. 10, 1998

(30) Foreign Application Priority Data

Jun. 10, 1997 (JP) .................................... 9-152179

(51) Int. Cl.$^7$ .................................... B29D 22/00

(52) U.S. Cl. .................... 264/516; 425/572; 425/577; 425/519; 249/82

(58) Field of Search .................. 264/572, 516, 264/519; 425/577; 249/82

(56) References Cited

U.S. PATENT DOCUMENTS

| | | | |
|---|---|---|---|
| 5,277,865 | * | 1/1994 | Hara et al. ........................... 264/572 |
| 5,534,216 | * | 7/1996 | Kamiyama .......................... 264/572 |
| 5,584,470 | | 12/1996 | Klotz . |
| 5,656,234 | * | 8/1997 | Kaneshi et al. ..................... 264/572 |
| 5,885,518 | * | 3/1999 | Hendry ............................... 264/572 |

FOREIGN PATENT DOCUMENTS

| | | |
|---|---|---|
| 0 624 447 | 11/1994 | (EP) . |
| 0 679 491 | 11/1995 | (EP) . |
| 1-168425 | 7/1989 | (JP) . |
| 4-212822 | 8/1992 | (JP) . |
| 5-278076 | 10/1993 | (JP) . |
| 5-301257 | 11/1993 | (JP) . |
| 6-315970 | * 11/1994 | (JP) . |
| 7-144336 | 6/1995 | (JP) . |
| 7-156184 | 6/1995 | (JP) . |
| 7-186178 | 7/1995 | (JP) . |

OTHER PUBLICATIONS

Patent Abstracts of Japan, vol. 96, No. 3, Mar. 29, 1996, & JP 07 290486, Nov. 7, 1995.
Patent Abstracts of Japan, vol. 96, No. 12, Dec. 26, 1996, & JP 08 216178, Aug. 27, 1996.

* cited by examiner

Primary Examiner—Jan H. Silbaugh
Assistant Examiner—Suzanne E McDowell
(74) Attorney, Agent, or Firm—Pillsbury Madison & Sutro LLP (57) ABSTRACT

A process for producing a thermoplastic resin hollow molded article is disclosed. The process takes place in a molding machine including first and second mold halves having respective mold surfaces defining a mold cavity. At least one of the mold halves is movable relative to the other mold half to permit the mold surfaces to be moved both towards and away from each other between closed state and unclosed states. At least the first mold half has incorporated therein at least one slidable block defining a portion of the mold surface of the first mold half. According to the process, thermoplastic resin is supplied in a molten state between the mold surfaces while the mold halves are in the unclosed state, and at least one of the mold halves is moved relative to the other mold half to press and spread the thermoplastic resin so that the cavity is filled with the thermoplastic resin. During the process, compressed gas is supplied into the thermoplastic resin located in the cavity. In order to permit expansion of the thermoplastic resin caused by the compressed gas, the slidable block is moved from away from the cavity along the same direction that the mold halves move. The mold is then opened and the thermoplastic resin hollow molded article is removed from the mold cavity.

21 Claims, 5 Drawing Sheets

PROCESS FOR PRODUCING THERMOPLASTIC RESIN HOLLOW MOLDED ARTICLE

BACKGROUND OF THE INVENTION

1. Field of the Invention

The present invention relates to a process for producing a molded article having a void inside, which molded article is made of a thermoplastic resin. The thermoplastic resin is, hereinafter, referred to as a "resin". The molded article having the void inside and made of the resin is referred to as a "resin hollow molded article" or a "hollow molded article".

2. Description of Related Art

Japanese unexamined patent publications Nos. hei 4-212822 and hei 7-144336 disclose a process for producing a hollow molded article utilizing a core retreating method. In this process, a molten resin is injected with an extremely high pressure into a cavity which is completely closed with a predetermined clearance. After filling the cavity with the resin, a movable core is retreated to expand the cavity while injecting the high pressure gas into the molten resin. Consequently, a void is formed in a resin substrate. However, in such a hollow molding process utilizing an injection molding method, an extremely high clamping force must be applied to a mold because the molten resin is injected with a high pressure in order to fill the cavity. Therefore, a clamping machine inevitably becomes large and expensive. Additionally, a molded article to be obtained suffers from deformation and warp due to residual stress. Moreover, a pressure to be applied to the movable core is very high because the molten resin is injected into the cavity with a high pressure. Hence a machine for holding the movable core and retreating the same is obliged to become large in order to hold the movable core at a predetermined position with opposing to the high pressure of the molten resin and in order to retreat it smoothly.

SUMMARY OF THE INVENTION

An object of the present invention is to dissolve aforementioned problems of the conventional process. In other words, the object of the present invention is to provide a process for producing a hollow molded article of high quality which does not suffer from either deformation or warp using a simple and cheap machine.

According to an aspect of the present invention, there is provided a process for producing a hollow molded article, comprising the following steps of:

Step (A) providing a molding machine comprising a mold including the first mold half and the second mold half, wherein the first mold half has the first mold surface, the second mold half has the second mold surface, the mold surfaces together define a cavity, the mold halves can relatively move so that the mold surfaces approach and go away from each other, at least one of the mold halves comprises a body and a slidable block, the mold surface of the mold half comprising the body and the slidable block comprises a surface of the body and a surface of the slidable block, the slidable block can move from the first position to the second position along the same direction of movement that the first and second mold halves move between their closed and unclosed states, the movement of the slidable block from the first position to the second position can expand the cavity, and the molding machine has means for supplying compressed gas into the cavity;

Step (B) supplying a thermoplastic resin, which is in a molten state, to between the first mold surface and the second mold surface while the mold being in an unclosed state;

Step (C) relatively bringing the mold halves close to each other to press the thermoplastic resin and spread the same so that the cavity is filled with the thermoplastic resin;

Step (D) injecting the compressed gas into the thermoplastic resin which is located in the cavity by the operation of the means for supplying the compressed gas;

Step (E) moving the slidable block from the first position to the second position; and Step (F) moving at least one of the mold halves relative to the other mold half to open the mold and to take out the thermoplastic resin hollow molded article.

In an embodiment of the present invention, the above steps are performed in the order, Step (A), Step (B), Step (C), Step (D), Step (E), Step (F). In another embodiment of the present invention, the above steps are performed in the order, Step (A), Step (B), Step (C), Step (E), Step (D), Step (F). In still another embodiment of the present invention, at least a part of Step (B) is performed with at least a part of Step (C). In yet another embodiment of the present invention, at least a part of Step (C) is performed with at least a part of Step (D). In an embodiment of the present invention, at least a part of Step (D) is performed with at least a part of Step (E). In another embodiment of the present invention, Step (B), Step (C), Step (D) and Step (E) are performed under a condition that temperature of a mold surface of the slidable block is lower than that of a mold surface of the body. In still another embodiment of the present invention, Step (B), Step (C), Step (D) and Step (E) are performed under a condition that escape of heat from the thermoplastic resin to a part of the body which is located in the vicinity of the slidable block can be prevented. In yet another embodiment of the present invention, supply of the thermoplastic resin is started when the slidable block exists at the first position and the mold surface of the slidable block existing at the first position is depressed below the surface of the body which is adjacent to the slidable block, in Step (B). In an embodiment of the present invention, pressure of the compressed gas in Step (D) is not lower than about 1 kgf/cm² and lower than about 10 kgf/cm². In still another embodiment of the present invention, a further step of supplying a skin material to between the mold surfaces of the mold halves is performed prior to Step (B). In yet another embodiment of the present invention, the compressed gas is injected into the thermoplastic resin which is located over the body in Step (D). In an embodiment of the present invention, the compressed gas is injected into both the thermoplastic resin which is located over the slidable block and the thermoplastic resin which is located over the body in Step (D). In another embodiment of the present invention, a further step of ejecting gas from a void which was formed in the thermoplastic resin is performed after the beginning of Step (D). In still another embodiment of the present invention, a further step of changing the pressure which is applied to the thermoplastic resin is performed after the completion of filling the cavity with the thermoplastic resin. In yet another embodiment of the present invention, a further step of reducing the pressure which is applied to the thermoplastic resin is performed after the completion of filling the cavity with the thermoplastic resin. In an embodiment of the present invention, the step of injecting the compressed gas is performed after the reduction of the pressure applied to the thermoplastic resin. In another embodiment of the present invention, the step of moving the slidable block is performed after the reduction of the pressure applied to the thermoplastic resin.

The above and other aspects, embodiments, features and advantages of the present invention will become clear from the following description taken in conjunction with the accompanying drawings.

DESCRIPTION OF PREFERRED EMBODIMENT

Figure 1:
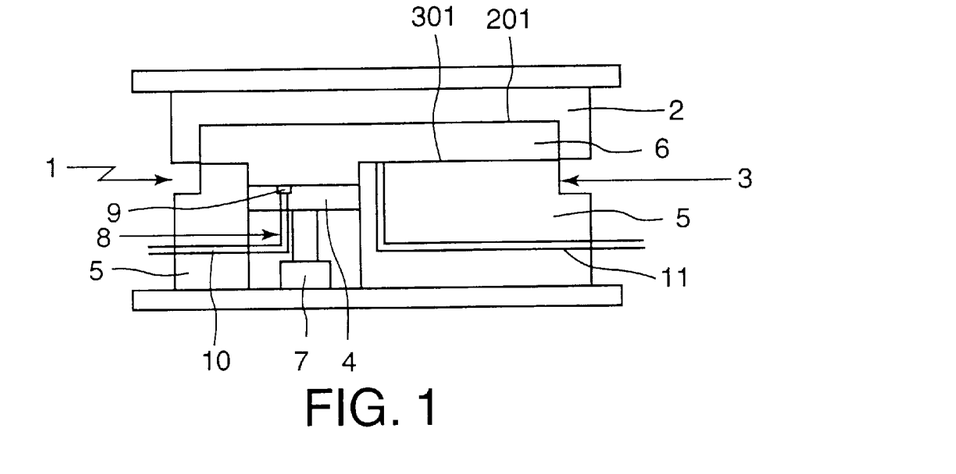
FIG. 1 is a cross-section of an example of the molding machine which is used in the process of the present invention.

FIG. 1 schematically illustrates an example of the molding machine which is used in the process of the present invention. The molding machine comprises the mold (1) including the first mold half (2) and the second mold half (3). Referring to FIG. 1, an example of the mold including a female mold half as the first mold half (2) and a male mold half as the second mold half (3) is shown. The mold surface of the first mold half (the first mold surface, 201) and the mold surface of the second mold half (the second mold surface, 301) can together define the cavity (6). The configuration of the mold surfaces is designed depending upon the shape of the hollow molded article to be produced. The mold halves can relatively move in a linear direction so that their mold surfaces can approach and go away from each other. The linear direction is not necessarily restricted to a vertical direction, a substantially vertical direction, a horizontal direction or a substantially horizontal direction. It is suitably determined depending upon a situation. Generally, at least one mold half is mounted to a driving machine (not shown), that is a mold clamping machine, and can move by the operation of the driving machine. The mold can come from an unclosed state to a closed state by the relative movement of the mold halves. In the present invention, a state in which a movement of a part of the mold halves other than the slidable block is necessary in order that the shape of the cavity becomes equal to the shape of the hollow molded article to be produced is defined as the unclosed state. On the other hand, a state in which the shape of the cavity can become equal to the shape of the hollow molded article to be produced only by the movement of the slidable block is defined as the closed state.

Figure 13:
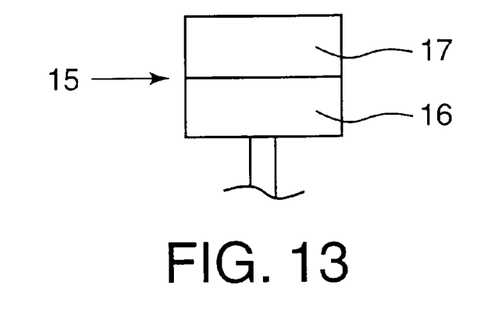
FIG. 13 is a cross-section of an example of the slidable block which is a composite block comprising a main piece and a sub-piece.
Figure 14A:
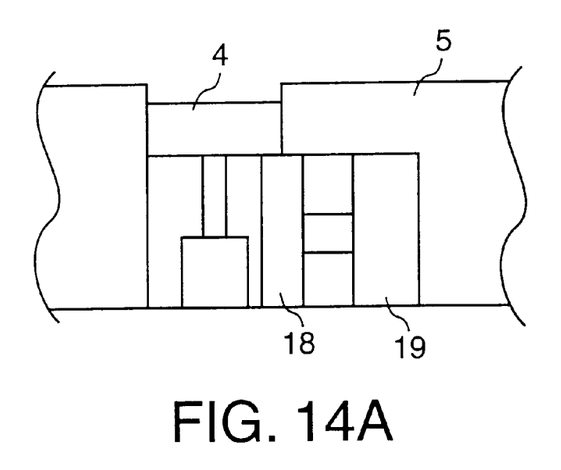
FIG. 14A shows a scene that the slidable block is held at the first position by a stopper.
Figure 14B:
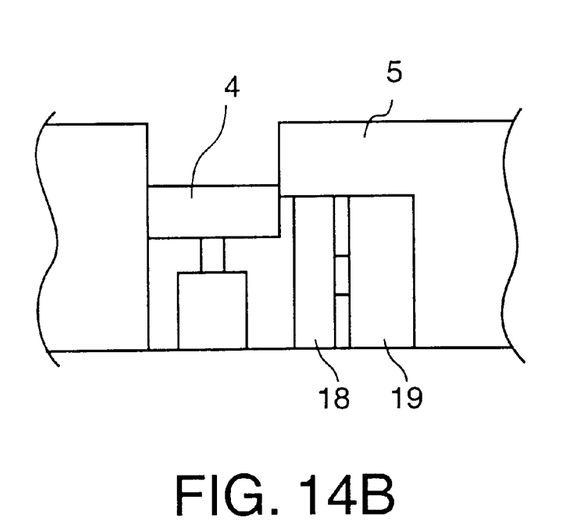
FIG. 14B illustrates a scene that the stopper has moved and consequently the slidable block has moved to the second position.

At least one mold half includes the body (5) and the slidable block (4). The mold surface of the mold half including the body and the slidable block comprises at least a part of the surface of the body and at least a part of the surface of the slidable block. Although the slidable block is usually provided in one mold half, it may be provided in both mold halves. One mold half may include a plurality of slidable blocks. The slidable block may comprise a single piece. Alternatively, the slidable block may be the composite block (15) comprising the main piece (16) and the sub-piece (17) which can be detached from the main piece. At least a part of a surface of the sub-piece constitutes at least a part of the surface of the slidable block. The thickness of the composite block can be adjusted by changing the thickness of the sub-piece. At least a part of the surface of the slidable block always faces and substantially contacts with at least a part of the surface of the body during the operation of the process of the present invention. Here, the state in which the surface of the slidable block faces and substantially contacts with the surface of the body means a state in which the slidable block is located close to the body so that the molten resin does not leak from a gap between the surface of the slidable block and that of the body. The slidable block can move from the first position to the second position with at least a part of its surface substantially contacting with at least apart of the surface of the body. Both the first position and the second position of the slidable block are relative positions based on the position of the body which constitutes the mold half with the slidable lock. The movement of the slidable block from the first position to the second position can expand the cavity and can increase the volume of the cavity if it is performed when the mold is in the closed state. The concrete first position and the concrete second position may be determined depending upon the size and shape of the molded article to be produced and the position, size and shape of the void to be formed. When a plurality of slidable blocks are provided, the first position and the second position of each slidable block may be individually determined. The slidable block may be connected with a conventional driving means (7) such as a hydraulic cylinder and an air cylinder so as to move at least from the first position to the second position. The molding machine may be equipped with the stopper for stably holding the slidable block at the first position. An example of the stopper is shown in FIGS. 14A and 14B. In this example, the stopper (18) can be moved by an operation of stopper driving means (19) such as a hydraulic cylinder and an air cylinder.

The position in the mold half where the slidable block is provided can be determined depending upon the shape of the molded article to be produced and the position of the void to be formed. The configuration of the surface of the slidable block which constitutes a part of the mold surface of the mold half is designed depending upon the shape of the molded article to be produced. When a plurality of slidable blocks are provided, the shape of each slidable block can be individually determined.

Cooling means (not shown) such as a cooling pipe may be provided in the slidable block. A coolant such as gas and liquid flows in the cooling pipe. The cooling pipe is generally connected with a coolant supplying machine through a connecting pipe such as a flexible pipe.

The molding machine has means (8) for supplying the compressed gas into the cavity. Such means is, hereinafter, referred to as "gas supplying means". The gas supplying means is generally provided to at least one mold half. When the gas supplying means is provided to the mold half comprising the body and the slidable block, it may be provided to the body, or to the slidable block, or to both the body and the slidable block. The concrete structure of the gas supplying means is not restricted as long as the gas supplying means can supply the compressed gas, which is sent from a compressed gas supplying machine, at a predetermined position with a predetermined pressure and predetermined rate and can start and stop supplying the compressed gas into the cavity. For example, gas supplying means comprising a gas supplying member (9), a gas path (10) and the compressed gas injection machine (not shown) which is disclosed in European Patent Publications Nos. 0729820A, published on Sep. 4, 1996, and 0791447A, published on Aug. 27, 1997, and which is illustrated in FIG. 1 can be employed in the present invention. The gas injection member may be a porous material and a formed body having a penetrating hole inside and/or a groove on its surface which are disclosed in the above-listed European Patent Publications. The gas injection member also may be a pin having a gas injection opening which is disclosed in U.S. Pat. No. 5,562,878, issued on Oct. 8, 1996 to Matsumoto et al. The pin is called a "fluid-ejecting pin" in the patent. Alternatively, gas supplying means in which a gas passage, that is directly bored into the mold half and opens to the mold surface of the mold half, is connected to the compressed gas supplying machine through the gas path as also described in the above European Patent Publications may be applied to the present invention. The entire disclosures of the European Patent Publications Nos. 0729820A and 0791447A and U.S. Pat. No. 5,562,878 are herein incorporated by reference. The gas supplying means may have a valve (not shown) for controlling a passing condition such as passing amount and pressure of the compressed gas. The gas supplying means which can be used in the present invention include other ones whose function is equivalent to that of the above exemplary gas supplying means.

It is preferred that means (not shown) for preventing escape of heat from the resin to the mold half such as a heat insulator and a local heater is provided at a suitable position in the mold half in order to make the advancement of solidification of the resin, which stays close to a position where the compressed gas is injected, slow so as to make the injection of the compressed gas easy. A material having a thermal conductivity which is smaller than that of the materials of the slidable block and the body, such as thermosetting resin, can be utilized as the heat insulator.

The molding machine may also be equipped with means (not shown) for ejecting gas from the void formed in the molded article. The means for ejecting gas may comprise, for example, a pin having a penetrating hole and a gas ejection path one end of which leads to the penetrating hole and another end of which leads to a space outside the molding machine. The gas ejection path may be connected with a gas recovering machine instead of opening to the space. It is possible to employ the aforementioned means for supplying gas as the means for ejecting gas.

Using the above-mentioned molding machine, the process of the present invention is performed in accordance with the procedure comprising the steps which will be described below.

Figure 2:
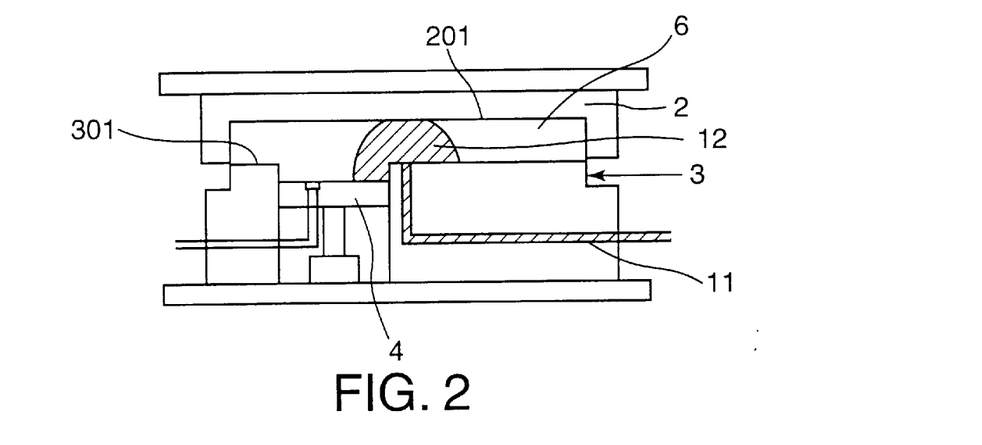
FIG. 2 illustrates a scene in which the resin is supplied to between the mold surfaces.
Figure 3:
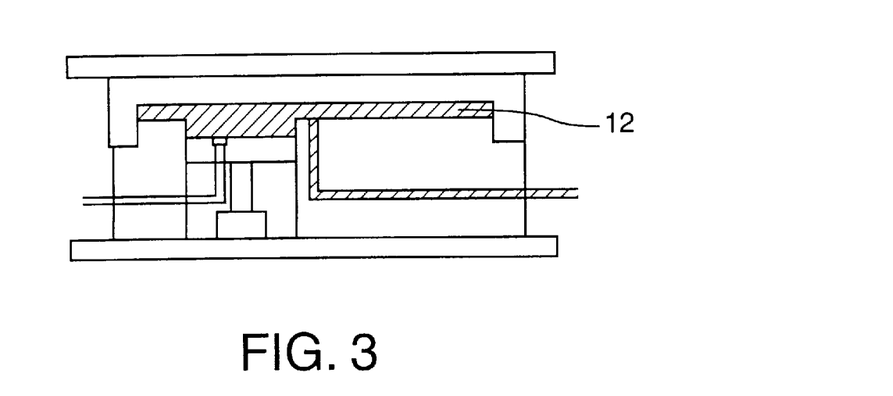
FIG. 3 illustrates a scene in which the cavity has been filled with the resin.

First, when the slidable block is located at the first position, the resin (12) in a molten state is supplied to between the mold surfaces (201 and 301) of the first mold half (2) and the second mold half (3) which are in the unclosed state, as illustrated in FIG. 2. The resin is pressed and spread in the cavity (6) by mold clamping, that is, by relatively moving the mold halves close to each other. Consequently, the cavity is filled with the resin (12) as shown in FIG. 3. The mold clamping may be commenced at the same time when the supply of the resin has been completed. Alternatively, the mold clamping may be started after the completion of supplying the resin. Still alternatively, at least a part of the step of supplying the resin may be performed with at least a part of the step of mold clamping. For example, the mold clamping may be commenced while the resin being supplied. It is also possible that the resin begins to be supplied while the mold being clamped and the supply of the resin finishes before or at the same time when the mold clamping has been completed. A method for supplying the resin is not particularly restricted, but it is preferred that the resin is directly supplied into the cavity through a resin path (11) which is provided in at least one mold half in order to prevent the resin from excessive cooling before the injection of the compressed gas. Alternatively, the resin may be supplied to between the mold surfaces using a resin supplying machine (not shown) which has a nozzle for injecting the resin and which is equipped outside the molding machine. This method is mainly employed in case the mold clamping is performed after the completion of supplying the resin. In the present invention, "the cavity is filled with the resin" means that the mold surface of each mold half which defines the cavity entirely or substantially entirely comes in touch with the resin. Therefore, the case that the cavity is filled with only the resin is, of course, included in the scope of the present invention. Moreover, the case that the mold clamping is performed with the injection of the compressed gas into the resin and subsequently the mold surfaces entirely or substantially entirely come in touch with the resin after the void has been formed in the resin also falls within the scope of the present invention.

Figure 4:
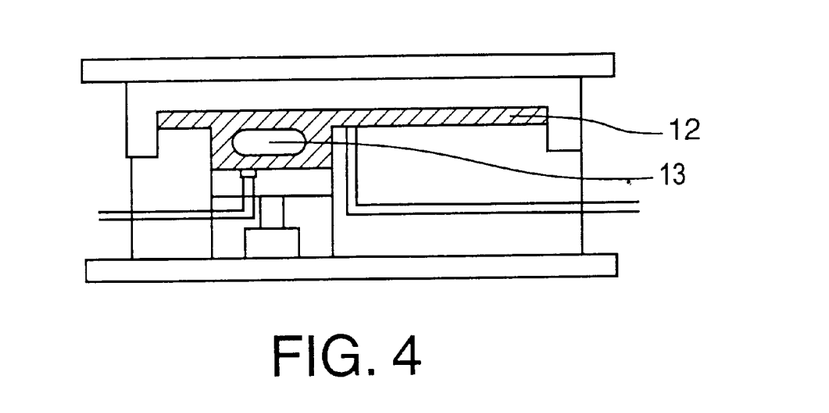
FIG. 4 illustrates a scene in which the void has been formed in the resin.

The injection of the compressed gas into the resin which was supplied to between the mold surfaces is commenced after the arrival of the resin at the position where the compressed gas should be injected. For example, in case that the compressed gas is supplied through a gas supplying opening which opens to the mold surface, the injection of the compressed gas is started after the gas supplying opening has been covered with the resin. The injection of the compressed gas may be performed with at least one step which is selected from supplying the resin and clamping the mold. The supply of the compressed gas is preferably commenced during the period from the completion of filling the cavity with the resin to the beginning of the movement of the slidable block. Especially, it is preferred that the injection of the compressed gas is started in a short period of time, generally in about 15 seconds, from the completion of filling the cavity with the resin. The compressed gas may be continuously injected until the resin is cooled to be substantially completely hardened or may be intermittently injected. FIG. 4 illustrates a scene that the void (13) has been formed in the resin (12). After the void has been formed in the resin, the injection of the compressed gas may be stopped during cooling the resin, and then pressure inside the void may be maintained so that the hollow molded article does not deflate.

The compressed gas is injected into the cavity at one or more points. The position at which the compressed gas is injected may be determined depending upon the shape and size of the hollow molded article to be produced, the shape, size and number of the void to be formed and so on. In order to form the void in a portion of the cavity which is made by the movement of the slidable block, it is preferred that the compressed gas is injected into the resin from the gas injection member which is provided in the slidable block. Such an operation can efficiently form the void and the hollow molded article with an excellent appearance can be obtained.

Examples of gas which is employed as the compressed gas include gases which are inert to the resin such as air, nitrogen and carbon dioxide. The compressed gas may be a high pressure gas of about 10 kgf/cm$^2$ or more and may be a low pressure gas which has a pressure less than about 10 kgf/cm$^2$. Compressed air having a pressure less than about 10 kgf/cm$^2$ is preferably employed. In general, the lower limit of pressure of the compressed gas which can be used in the present invention is about 1 kgf/cm$^2$. The pressure of the compressed gas to be injected may be constant for the injection or may be changed during the injection.

In the process of the present invention, it is possible to eject the gas which was injected into the resin. The ejection of the gas may be started at any suitable time after the beginning of the injection of the compressed gas. Generally, it is commenced after the void having a desired size has been formed. For example, ejecting the gas with injecting the compressed gas makes the compressed gas flow in the void to promote the cooling of the resin and shorten a molding cycle. Alternatively, the ejection of the gas and the injection of the compressed gas may be repeated alternately. The gas can be ejected from the void through the pin having the penetrating hole for ejecting the gas which has been inserted into the void through a resin wall of the hollow molded article. In another situation, after a join of voids which were caused by the injection of the compressed gas from a plurality of gas injection openings, the gas may be ejected through at least one gas injection opening while the compressed gas being continued to be injected from other gas injection openings. In this situation, the gas supplying means can be utilized also as the means for ejecting gas.

In order to form a satisfactory void in the resin, the retreat of the slidable block from the first position to the second position is also necessary in addition to the injection of the compressed gas. When the slidable block is placed at the first position, its mold surface may form a combined surface with virtually no step together with that of the adjacent body. Also the mold surface of the slidable block may protrude from the mold surface of the body. It is preferred that the mold surface of the slidable block is dented from that of the adjacent body because a large void can be formed. The slidable block is moved from the first position to the second position at any suitable time after the beginning of supplying the resin. A time when the movement of the slidable block starts is determined depending upon the size and shape of the hollow molded article to be produced, the size, shape and position of the void to be formed, pressure of the compressed gas, mold temperature, the type of the resin to be used, temperature of the resin to be injected, the size and stroke of the slidable block. For example, the slidable block may start to be retreated immediately after the cavity has been filled with the resin. Alternatively, the movement of the slidable block may start after a predetermined time has passed after the completion of filling the cavity with the resin. When the slidable block is moved before the finish of the mold clamping, it is preferred that the mold clamping is completed before the arrival of the slidable block at the second position. The compressed gas may start to be injected into the cavity prior to the retreat of the slidable block. The injection of the compressed gas and the retreat of the slidable block may be started at the same time. It is preferable that the slidable block starts to retreat at a time when the resin which is located near the surface of the slidable block has adequately hardened after the cavity was filled with the resin. The slidable block preferably commence to be retreated after the beginning of supplying the compressed gas. Specifically speaking, the retreat of the slidable block is preferably commenced in a period of from about 1 second to about 15 seconds after the completion of filling the cavity with the resin. Starting there treat of the slidable block too early and doing it too late both result in the hollow molded article with an unsatisfactory shape. It is because, in both cases, the resin can not smoothly move with following the slidable block. In general, the injection of the compressed gas is continued throughout the retreat of the slidable block.

Exemplary procedures of controlling the movement of the slidable block are as follows. For example, the slidable block which is connected with a cylinder such as a hydraulic cylinder and an air cylinder and which has been held at the first position can be moved to the second position by the operation of the cylinder at a predetermined time. Alternatively, the slidable block which has been held at the first position with the stopper may be retreated to the second position by releasing the stopper and applying a pressure on the surface of the slidable block facing the cavity. In such case, the aforementioned cylinder may be employed together with the stopper as shown in FIGS. 14 A and 14B. In case the stopper holds the slidable block at the first position, the stopper can be easily released by decreasing a mold clamping force to reduce the pressure which is applied to the slidable block at the beginning of the retreat of the slidable block. At this time, since a pressure which is applied to the resin is also reduced, the void can easily formed.

Figure 5A:
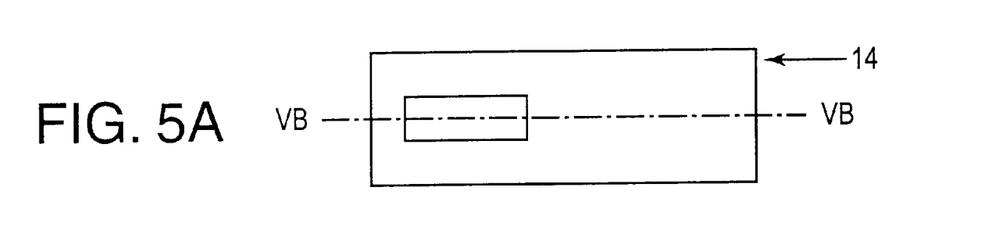
FIG. 5A is a plan view of an example of the hollow molded article which is produced according to the process of the present invention.
Figure 5B:
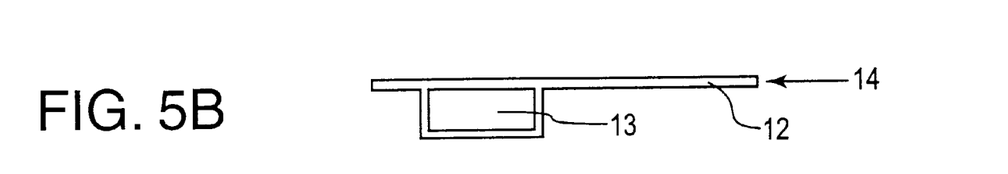
FIG. 5B is a cross-section of the hollow molded article illustrated in FIG. 5A which is taken on the line VB—VB of FIG. 5A.
Figure 6A:
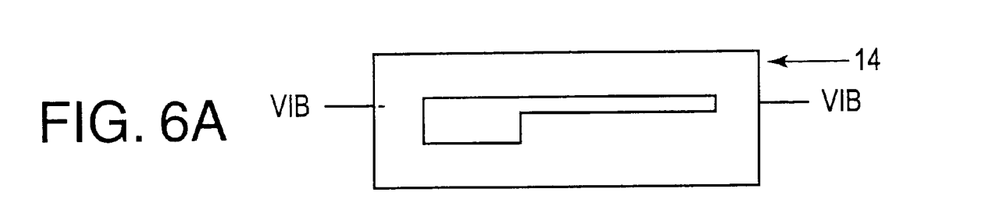
FIG. 6A is a plan view of another example of the hollow molded article which is produced according to the process of the present invention.
Figure 6B:
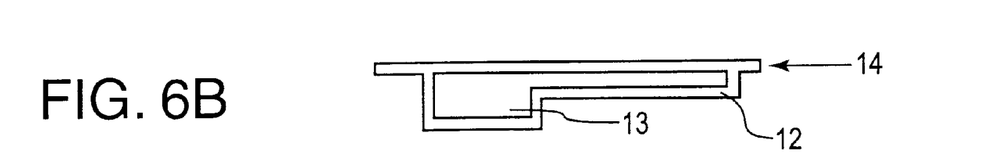
FIG. 6B is a cross-section of the hollow molded article illustrated in FIG. 6A which is taken on the line VIB—VIB of FIG. 6A.
Figure 7:
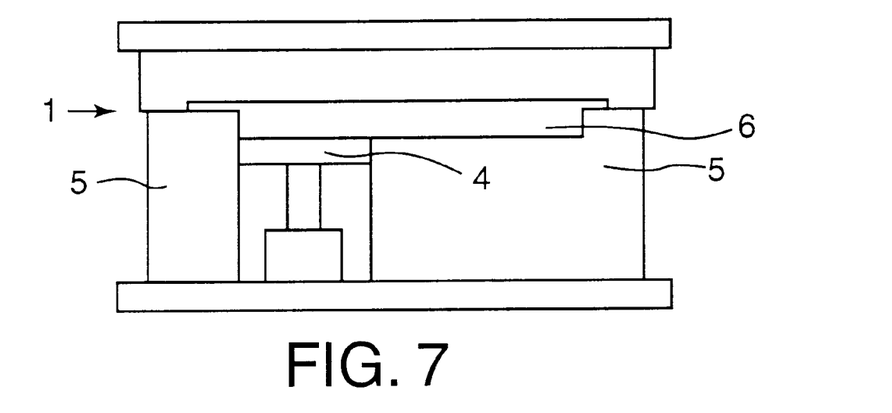
FIG. 7 is a cross-section of another example of the molding machine which is used in the process of the present invention.
Figure 8:
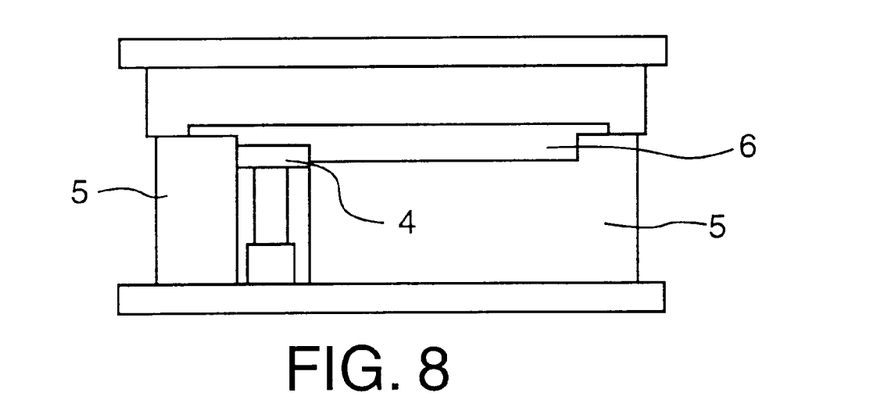
FIG. 8 is a cross-section of still another example of the molding machine which is used in the process of the present invention.
Figure 9:
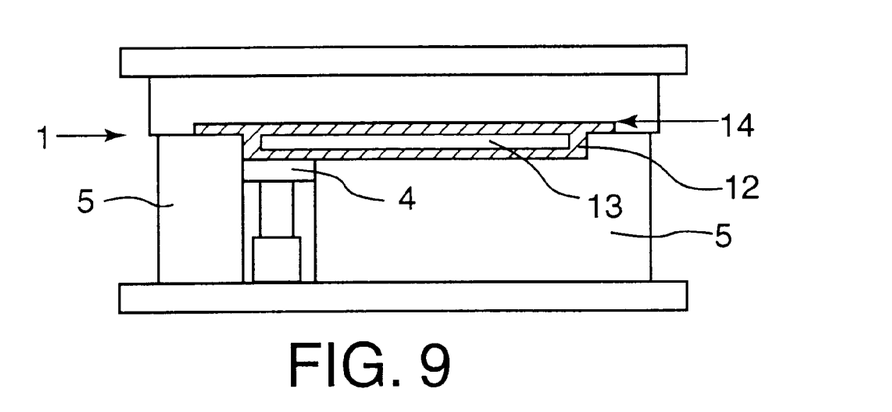
FIG. 9 illustrates a scene in which the hollow molded article has been formed in the cavity of the molding machine illustrated in FIG. 8.
Figure 10:
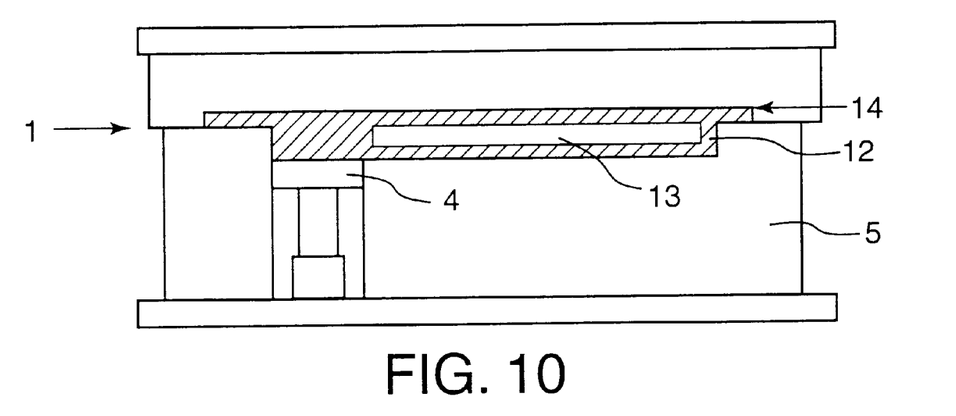
FIG. 10 illustrates a scene in which another hollow molded article has been formed in the cavity of the molding machine illustrated in FIG. 8.
Figure 11:
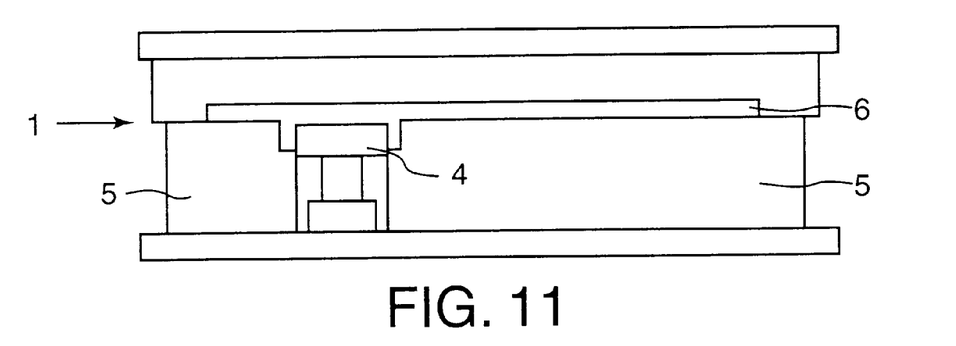
FIG. 11 is a cross-section of yet another example of the molding machine which is used in the process of the present invention.
Figure 12:
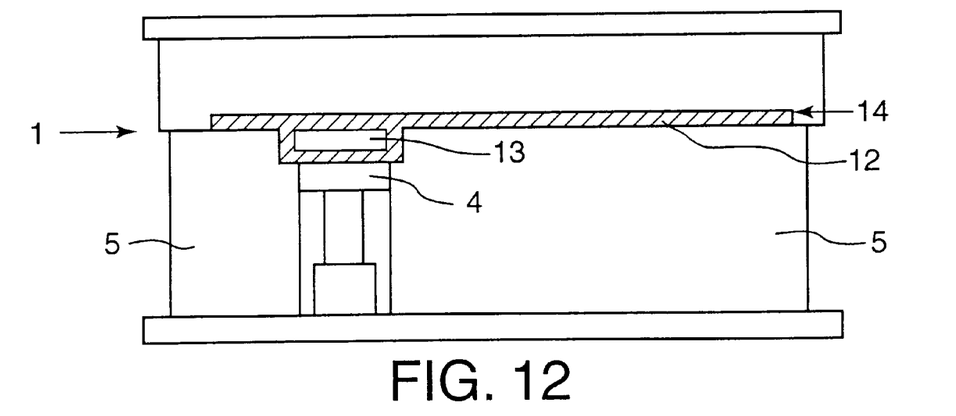
FIG. 12 illustrates a scene in which the hollow molded article has been formed in the cavity of the molding machine illustrated in FIG. 11.

For example, the hollow molded article (14) having the void (13) as shown in FIGS. 6A and 6B can be produced according to a procedure including the steps of providing the mold (1) which is movable in the vertical direction as shown in FIG. 7; filling the cavity with the resin; and then injecting the compressed gas over both the slidable block (4) and the body (5) while retreating the slidable block from the first position to the second position so as to form a single void which spreads over both the slidable block and the body. FIG. 6A indicates a plan view of the hollow molded article. FIG. 6B is a cross-section which is taken in a thickness direction on the line VIB—VIB of FIG. 6A. In the above method, the same hollow molded article can be produced by injecting the compressed gas only over the body under the influence of the retreat of the slidable block. A void (13) spreading from over the body (5) through over the slidable block (4) can be formed and the hollow molded article (14) as shown in FIG. 9 can be produced according to a procedure similar to that mentioned above using a mold (1) which is vertically movable as shown in FIG. 8. Also, in case using the molding machine illustrated in FIG. 8 and injecting the compressed gas over the body (5), the void can be formed mainly over the body (5) to produce the hollow molded article (14) shown in FIG. 10 by properly settling the first position and the second position of the slidable block. Using a mold that includes a body which has a concavity for forming a projection of the hollow molded article such as a rib and a boss and injecting the compressed gas into the concavity, the hollow molded article having the projection can be obtained. When a projection having the void inside is long, it is generally called a "gas channel". The resin which was replaced with the compressed gas generally moves toward the slidable block through the agency of both a pressure of the compressed gas and the movement of the slidable block. The resin which moved is spent, for example, on the formation of a core of the hollow molded article and the formation of the resin wall which covers a mold surface which has newly appeared as a result of the movement of the slidable block. Using the mold (1) illustrated in FIG. 11 and lowering the slidable block (4) while supplying the compressed gas over the slidable block, the void (13) can be formed mainly over the slidable block as shown in FIG. 12. FIGS. 5A and 5B are a plan view of the hollow molded article obtained by the above method and a cross-section of the same in its thickness direction taken along the line VB—VB in the plan view, respectively.

Taking conditions such as the size of the void to be formed, pressure of the compressed gas, mold temperature, the type and temperature of the resin and the size and stroke of the slidable block into consideration, a moving speed of the slidable block is determined. A hollow molded article having a hollow portion with an excellent appearance can be stably produced by controlling the moving speed of the slidable block by the operation of the driving means connected to the slidable block and moving the slidable block in the agency of the pressure of the compressed gas which was injected. If the slidable block moves too fast, the resin wall of the hollow portion becomes extremely thin or uneven in thickness. And sometimes the resin wall of the hollow portion breaks. On the other hand, when the slidable block moves too slow, the viscosity of the resin becomes high during the movement of the slidable block and the resin wall of the hollow portion is formed unsatisfactorily.

Using the mold including a slidable block which is equipped with the cooling means to make the mold surface of the slidable block cooler than that of the body, it is possible to rapidly harden the resin only in the vicinity of the slidable block. As a result, the resin wall of the hollow portion can be formed satisfactorily. Additionally, the hollow molded article having a satisfactory resin wall can be stably produced in the repetition of molding. Using the composite block (15) comprising the main piece (16) and the sub-piece (17) which has been previously cooled as shown in FIG. 13, a similar effect can be achieved. The cooled sub-piece may be changed either every molding cycle or every several cycles.

Keeping temperature of a part of the body near the slidable block permits the resin near the part to get slow to be cooled and permits the resin wall of the hollow portion to be formed satisfactorily. Examples of means for keeping the temperature include the local heater and a member made of the material which has the thermal conductivity which is lower than that of the material of the body.

The resin which has been supplied into the cavity is given a pressing operation until opening the mold. A pressure to be applied to the resin is not required to be constant for the pressing operation. The pressure may be changed during the pressing operation, if necessary. For example, the pressure is increased until at least the cavity is filled with the resin to reach a maximum pressure of P1. After that, the pressure maybe maintained at P1 until the resin hardens. Alternatively, after maintaining the pressure at P1 for a predetermined period of time, the pressure may be reduced to P2 which is lower than P1. A time when the pressure is reduced maybe immediately after the cavity has been filled with the resin or immediately before the resin hardens. It is preferred that the pressure is reduced in a period of from about 1 second to about 15 seconds after the completion of filling the cavity with the resin. And then, the pressure may be maintained at P2 until the resin has hardened. Alternatively, after maintaining the pressure at P2 for a predetermined period of time, the pressure may be increased to P3 which is higher than P2. Although P3 may be lower than, higher than or equal to P1, it is at most about three times as high as P1. The increase in the pressure from P2 to P3 results in a hollow molded article with the superior outward.

In the case that the pressure is reduced from P1 to P2 during the pressing operation, the slidable block may start to be retreated before the pressure is reduced, but it is preferred that the retreat of the slidable block is started either at the same time or after the pressure is reduced.

After the desired void has been formed, the mold halves are relatively moved away from each other to open the mold when the resin has moderately hardened. And then, the hollow molded article is taken out.

A variety of thermoplastic resins which are employed in conventional molding methods such as injection molding, injection compression molding, compression molding, extrusion molding and stamping molding can be utilized in the process of the present invention. For example, a conventional thermoplastic resin such as polyolefin resins e.g. polyethylene and polypropylene, polystyrene, polycarbonate, acrylonitrile-styrene-butadiene block copolymer and polyamide; a thermoplastic elastomer such as ethylene-propylene block copolymer and ethylene-butadiene block copolymer; and a polymer alloy thereof may be used as the thermoplastic resin in the present invention. The thermoplastic resin may contain a variety of conventional additives such as, for example, a pigment, a lubricant, an antistatic agent and an antioxidant.

For the purpose of decorating the surface of the hollow molded article and providing a cushion property to the hollow molded article, a skin material may be provided onto the surface of the hollow molded article. For example, the skin material can be stuck onto the surface of the previously produced hollow molded article with adhesive. On the other hand, the hollow molded article onto whose surface the skin material is stuck can be produced by supplying the skin material to between the mold halves and then performing the aforementioned steps. In this modified process, the resin is generally supplied to a rear side of a designed surface of the skin material. Although the skin material can be chosen depending upon use of the product, it may be paper, woven fabric, unwoven fabric, knit, a net such as wire gauze, a film or sheet made of thermoplastic resin or thermoplastic elastomer. The skin material may have decorations such as print and an uneven pattern e.g. an grain pattern on its surface. The skin material may be lined with a foamed sheet made of polypropylene, polyethylene, polyvinyl chloride, polyurethane and the like or a thermoplastic elastomer sheet.

On the occasion of performing the process of the present invention, conditions such as temperature of the resin to be supplied, a cavity clearance which is defined when the resin is supplied, a mold clamping speed, mold temperature may be determined according to the type of the resin to be used, the size and shape of the mold, the type of the skin material and the like.

According to the process of the present invention, the hollow molded article of a high hollow rate without any warp and strain can be readily produced using the simple and cheap molding machine. The obtained hollow molded article can be suitably employed as interior parts of an automobile such as an instrument panel, a door trim, a seat back, a consol box and a deck board; and various panels.

EXAMPLE

The following example is one of preferred embodiments of the present invention, but it should not be construed that this example limits the scope of the present invention.

A hollow molded article shown in FIGS. 5A and 5B was produced using a molding machine comprising a pair of a female mold half and a male mold half which are vertically moved. The molding machine is schematically illustrated in FIG. 1. The male mold half had a body and a slidable block. A projective shape of a cavity onto a hypothetical plane which is perpendicular to the mold clamping direction was 250 mm long and 750 mm wide. A projective shape of the slidable block onto the hypothetical plane was 100 mm long and 250 mm wide. The top of the slidable block was a flat surface whose shape is identical to the projective shape of the slidable block.

A position, where the slidable block was located with its top being 5 mm below the mold surface of the body which was adjacent to the slidable block, was defined as the first position. On the other hand, a position, where the slidable block was located with its top being 35 mm below the mold surface of the body which was adjacent to the slidable block, was defined as the second position. Hence a stroke of the slidable block was 30 mm. The slidable block could be moved in a vertical direction by a hydraulic cylinder.

A cylindrical sintered copper (gas injection member) 10 mm in diameter and 10 mm long was buried in the center of the slidable block so that its top surface could make a plane together with the top surface of the slidable block. A rear end of the sintered copper was connected to a gas path which led to a compressed gas supplying machine.

When the mold was in an unclosed state where a clearance defined between the body and the female mold half was 30 mm, molten polypropylene resin (Sumitomo Noblen BPZ5284 manufactured by Sumitomo Chemical Co., Ltd.; temperature: 210° C.) was supplied to between the mold surfaces from a resin path provided in the male mold half. Almost at the same time when the predetermined amount of resin finished to be supplied, the female mold was lowered until the clearance defined between the body and the female mold became 3 mm to close the mold with a maximum clamping force of 100 tonf. Consequently, the resin was flowed thereby to fill the cavity with the resin.

The clamping force was maintained for 3 seconds at 100 tonf and subsequently reduced to 30 tonf. At the same time, a compressed gas of 6 $kgf/cm^2$ started to be injected through the gas injection member and the slidable block was moved.

After the slidable block reached the second position, the resin was cooled for 40 seconds to be solidified while continuing pressing the resin with the clamping force of 30 tonf and injecting the compressed gas. After stopping the injection of the compressed gas, the mold was opened and a hollow molded article was taken out.

The obtained hollow molded article was 3 mm thick at a part which was formed between the female mold half and the body of the male mold half. A part which was formed between the female mold half and the slidable block of the male mold half had a thickness of 38 mm and a void was formed with a hollow rate of about 80% therein. Thickness of an upper wall, a lower wall and a side wall of the latter part were about 3 mm each.

The present invention is described and claims the benefit of Japanese ApplicationNo. hei 9-152179, filed on Jun. 10, 1997, the complete disclosure of which is hereby incorporated herein by reference.

What is claimed is:

1. A process for producing a thermoplastic resin hollow molded article, comprising the steps of:

(a) providing a molding machine comprising first and second mold halves having respective mold surfaces and collectively defining a mold cavity, at least one of the mold halves being movable relative to the other mold half to permit the mold surfaces to be moved both away from each other from a closed state to an unclosed state along a direction of movement and towards each other from the unclosed state to the closed state, at least the first mold half comprising a body and having incorporated therein at least one slidable block, the body and slidable block having respective surfaces that collectively provide the mold surface of the first mold half, the slidable block being movable independently of the body from a first position to a second position, wherein the surface of the slidable block is at a greater distance from the other mold half surface than the surface of the body, to permit expansion of the cavity while the mold halves are maintained in the closed state, the molding machine having means for supplying compressed gas into the cavity;

(b) supplying a thermoplastic resin in a molten state between the mold surfaces of the first and second mold halves while the mold halves are in the unclosed state;

(c) moving at least one of the mold halves relative to the other mold half to press and spread the thermoplastic resin so that the cavity is filled with the thermoplastic resin;

(d) injecting compressed gas into the thermoplastic resin located in the cavity with the supplying means;

(e) moving the slidable block from the first position to the second position along the direction of movement; and (f) moving at least one of the mold halves relative to the other mold half to open the mold cavity and removing the thermoplastic resin hollow molded article from the mold cavity.

2. A process according to claim 1, wherein said steps (a), (b), (c), (d), (e), and (f) are sequentially performed in that order.

3. A process according to claim 1, wherein said steps (a), (b), (c), (e), (d), and (f) are sequentially performed in that order.

4. A process according to claim 1, wherein at least a part of said step (b) is performed simultaneously with at least a part of said step (c).

5. A process according to claim 1, wherein at least a part of said step (c) is performed simultaneously with at least a part of said step (d).

6. A process according to claim 1, wherein at least a part of said step (d) is performed simultaneously with at least a part of said step (e).

7. A process according to claim 1, wherein said steps (b), (c), (d), and (e) are performed under conditions in which the slidable block surface has a lower temperature than the body surface.

8. A process according to claim 1, further comprising performing said steps (b), (c), (d), and (e) while preventing heat from escaping from the thermoplastic resin to a part of the body located in the vicinity of the slidable block.

9. A process according to claim 1, wherein said step (b) of supplying a thermoplastic resin is started when the slidable block is at the first position and mold surface of the slidable block is depressed below the mold surface of the body, which is located adjacent to the slidable block.

10. A process according to claim 1, wherein the compressed gas has a pressure not lower than about 1 kgf/cm$^2$ and lower than about 10 kgf/cm$^2$ in step (d).

11. A process according to claim 1, wherein the compressed gas is compressed air.

12. A process according to claim 1, further comprising a step of supplying a skin material between the mold surfaces prior to said step (b).

13. A process according to claim 1, wherein said step (d) comprises injecting the compressed gas into a portion of the thermoplastic resin located over the body.

14. A process according to claim 1, wherein said step (d) comprises injecting the compressed gas into portions of the thermoplastic resin located over the body and over the slidable block.

15. A process according to claim 1, further comprising a step of ejecting gas from a void formed in the thermoplastic resin, said ejecting step being conducted after said injecting step (d) has commenced.

16. A process according to claim 1, further comprising a step of changing pressure applied to the thermoplastic resin after the cavity is filled with the thermoplastic resin.

17. A process according to claim 1, further comprising a step of reducing pressure applied to the thermoplastic resin after the cavity is filled with the thermoplastic resin.

18. A process according to claim 17, wherein step (d) is performed after said pressure reducing step.

19. A process according to claim 17, wherein step (e) is performed after said pressure reducing step.

20. A process according to claim 1, wherein said step (b) of supplying the thermoplastic resin is commenced when the slidable block is located in the first position and the surface of the slidable block is dented from the surface of the body positioned adjacent to the block.

21. A process according to claim 1, wherein the compressed gas is injected into the thermoplastic resin from a gas injection member provided in the slidable block.

* * * * *